United States Patent Office 3,534,106
Patented Oct. 13, 1970

3,534,106
METHOD OF PRODUCING MERCAPTANS FROM OLEFINS AND ALCOHOL FREE HYDROGEN SULFIDE
Paul F. Warner, Borger, Tex., assignor to Phillips Petroleum Company, a corporation of Delaware
No Drawing. Filed May 2, 1967, Ser. No. 635,349
Int. Cl. C07c 149/06
U.S. Cl. 260—609
8 Claims

ABSTRACT OF THE DISCLOSURE

Removal of an alcohol from a gas or vapor, e.g., methanol, from a hydrogen sulfide gas by contacting the gas with boron trifluoride. This method is particularly applicable to a method for converting a hydrogen sulfide containing gas to a mercaptan by reaction of said gas with an olefin as in the presence of a mercaptan synthesis catalyst, e.g., an $Al_2O_3$ and $SiO_2$ containing catalyst such as a silica-alumina catalyst or one prepared from montmorillonite. In one embodiment adding the boron trifluoride to the system at about the time catalyst activity tends to fall off and in another adding it to the hydrogen sulfide gas prior to the contact of the same with said olefin and/or said catalyst.

---

This invention relates to the removal of an alcohol from a gas or vapor.

This invention further relates to the treatment of a hydrogen sulfide gas. It also relates to the preparation of a mercaptan from hydrogen sulfide and an olefin. Further, it relates to the treatment of a hydrogen sulfide gas to remove therefrom an alcohol which is undesirable therein.

In one of its concepts the invention provides a method for the removal of an alcohol from a gas or vapor by contacting said gas or vapor with boron trifluoride.

In another of its concepts, the invention provides a method for the removal of an alcohol from a hydrogen sulfide containing gas by contacting said gas with boron trifluoride. In another of its concepts, the invention provides a method for the conversion of a hydrogen sulfide containing gas also containing an alcohol which has an adverse action upon a mercaptan synthesis catalyst by treating said gas with boron trifluoride, at least during, but preferably prior to the contact of said gas with said mercaptan synthesis catalyst and/or with an olefin or other compound which may be used.

In the synthesis of mercaptan employing a mercaptan synthesis catalyst such as Filtrol (a trademark) using a plant grade hydrogen sulfide gas resulting from the production of natural gas liquids, there will be usually present in the gas during the winter months an alcohol, e.g., methanol, which is used to prevent freeze up in the gas gathering system. The alcohol concentrates in the amine scrubber which, as is known, is employed to remove hydrogen sulfide from the natural gas. Subsequently, when the hydrogen sulfide is stripped from the spent amine solution, the alcohol will be found in the hydrogen sulfide. Alcohol is a severe poison for mercaptan synthesis catalyst such as Filtrol catalyst or other catalysts, such as silica-alumina catalysts. Thus, at times methanol content of an incoming hydrogen sulfide stream may be as high as 10 or more weight percent and usually will be in the range of from about 0.1 to about 1 weight percent. Even at these low concentrations, a Filtrol catalyst can be used only for a short period before olefin conversion drops to an uneconomical level and the catalyst must be discarded. Thus, in the synthesis of mercaptans for example tert-mercaptans employing a catalyst as herein disclosed, it is desirable to effect an improvement.

I have now found that the addition of an amount of gas, preferably approximately equal in weight to the methanol content, will form a complex with the methanol in the gas and that this complex is in its own right suitable for synthesis of mercaptans. Thus, instead of poisoning the Filtrol catalyst, or other catalyst, the methanolboron trifluoride complex serves to enhance the catalytic ability of the Filtrol. Indeed, where catalytic activity of the catalyst has substantially declined due to the presence of alcohol in the hydrogen sulfide gas, it is possible, upon the addition of boron trifluoride thereto, to substantially regain a high conversion rate. Thus, it is possible to add the boron trifluoride to the hydrogen sulfide gas or to a mixture of it with one or more olefins prior to contact of the gas or gases with the mercaptan synthesis catalyst or to add the boron trifluoride directly to the catalyst containing zone.

It is an object of this invention to sequester or to remove an alcohol from a gas or vapor containing the same. It is another object of this invention to sequester or to remove an alcohol from a hydrogen sulfide containing gas. It is another object of this invention to prevent the poisoning of a mercaptan synthesis catalyst by alcohol contained in a hydrogen sulfide gas which is passed to said catalyst to there react with an olefin to form a mercaptan. It is another object of this invention to provide a method for increasing or enhancing the efficiency of a mercaptan synthesis catalyst. It is a further object of this invention to revitalize a mercaptan synthesis catalyst which has been poisoned by an alcohol.

Other concepts and objects of this invention are apparent from a study of this disclosure and the appended claims.

According to the present invention, an alcohol such as methanol is removed from a gas or vapor containing the same, e.g., hydrogen sulfide containing gas by contacting said gas with boron trifluoride.

The alcohol is usually one employed to prevent freeze up of gas and gas gathering systems, e.g., a primary alcohol such as methanol. The alcohol will, of course, be one which will react with boron trifluoride to form a complex. When methanol is involved, the complex is in its own right a catalyst as earlier noted.

Also according to the invention there is provided a method for the synthesis of a mercaptan from a hydrogen sulfide containing gas and an olefin, the gas containing an alcohol which poisons the catalyst, the method comprising the step of adding to the system, preferably to the hydrogen sulfide gas as it enters the system, boron trifluoride, preferably in an amount approximately equal to its alcohol content.

In the synthesis of the invention in one embodiment thereof, a $C_{12}$–$C_{14}$ fraction derived from the catalytic polymerization of $C_3$ and $C_4$ olefins can be passed in admixture with the desired molar proportion of hydrogen sulfide into contact with the catalyst under conditions substantially as follows: pressures ranging from about 100 to 1500 pounds gauge; temperatures from about atmospheric to about 300° F. or higher. Among catalysts which can be here employed are those comprising a silica-metal oxide gel such as silica-alumina and with this catalyst a flow rate of from about 1 to about 10 liquid volumes of olefin per volume of catalyst per hour usually can or will be employed.

The temperature within the catalyst bed is chosen to conform with the catalyst activity, feed composition, operating pressure and the reaction time best suited to secure optimum conversion of the olefin to mercaptan, thus temperatures are usually maintained within the range of from about 100° F. to about 400° F., a somewhat more preferred range of from about 200 to 300° F. being preferred. Higher temperatures can be employed in special cases but in general higher temperatures tend to reduce selectivity of the reaction. In the conversion of $C_{12}$ and higher olefins to the corresponding mercaptans, a temperature range of from about 225 to about 275° F. with an active catalyst as disclosed herein is usually preferred.

Generally, catalysts which can be employed are disclosed and described in U.S. 2,426,646, issued Sept. 2, 1947, Walter A. Schulze. The disclosure of said patent is incorporated herein by reference. However, the metal there selected from Group III–B according to the Handbook of Chemistry and Physics, Chemical Rubber Company, 45th edition (1964) page B–2, would be selected from Group III–A. Similarly, the salts selected from Group III–B would be selected from Group III–A, and the salts of metals from Group IV–A would be selected from Group IV–B. Further, the metal oxide such as alumina would be not in excess of about 45 percent by weight and generally and more preferably would be between about 1–25 percent by weight on a dry basis. Further, the term "Filtrol catalyst" as employed herein is inclusive of the group of acid-activated adsorption contact catalyst made from relatively pure crystals of montmorillonite $(Mg, Ca)O \cdot Al_2O_3 \cdot 5SiO_2 \cdot nH_2O$. Such catalyst may be used either with liquids or with gases in either pellet or powder form.

The olefins or olefinic material suited to the practice of the present invention generally may be defined as those materials which have been used to produce mercaptans. Presently preferred are those olefins or materials which contain olefins having the formula

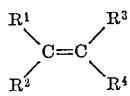

in which $R^1$, $R^2$, $R^3$ and $R^4$ represent the same or different alkyl, hydrogen or an aryl or heterocyclic radical. The olefin will be seletced to produce a mercaptan having up to approximately 20 carbon atoms.

The invention is now particularly adapted to the production of tert-dodecyl mercaptan using for example a propylene tetramer product which can be obtained substantially as disclosed in my Pat. 2,592,089, issued Apr. 8, 1952, the disclosure of which is incorporated herein by reference. When butylenes are contained in the propylene charging stock, the tetramer product will contain other than 12 carbon atoms as is known.

Generally the reaction of the invention is exemplified by the following equation in which the R's are as earlier stated.

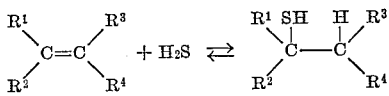

Triisobutylene can be reacted with $H_2S$ to produce tert-dodecyl mercaptan. U.S. Pat. 3,137,735, issued June 16, 1964, Paul F. Warner and Richard D. Franz, describes and claims a process for preparing a mercaptan from isobutylene and $H_2S$ employing a catalyst system consisting essentially of $BF_3 \cdot H_3PO_4 \cdot ROH$. The catalyst consists essentially of a liquid complex of an oxygen-containing acid of phosphorous, an alcohol of 1 to 5 carbon atoms, and $BF_3$. The catalyst is prepared by mixing the acid and the alcohol and adding $BF_3$ to the mixture as further described in said patent, the disclosure of which is also incorporated herein by reference. Other patents which are of interest and related to the preparation of mercaptans by reaction of hydrogen sulfide and an olefin or olefin-containing material are 2,434,510, John F. Olin and John L. Eaton, issued Jan. 13, 1948; 2,502,596, Walter A. Schulze, issued Apr. 4, 1950; and 3,166,598, Ralph C. Cole, issued Jan. 19, 1965. The disclosures of these patents are also incorporated herein by reference.

The following examples are given by way of further illustrating this invention, it being understood that the several concepts thereof are not necessarily only in the use of the specific materials specifically mentioned herein or in the examples, but rather as stated herein.

EXAMPLE I

Filtrol Grade 71 (16–200 mesh) catalyst was placed into a stainless steel pipe equipped with a jacket and a thermal well. The jacket was filled with water and it was maintained heated to its boiling point electrically. Prior to this, the catalyst had been heated at 400° F. in a stream of dry air to activate the same in place. The $H_2S$-tetramer-methanol mixture in a weight ratio of 10.33/32.69/0.2 respectively was passed through the catalyst at 800 p.s.i.g. at about 2 volumes per volume per hour. Effluent samples were analyzed at intervals and the operation was continued until the mercaptan content had dropped to below 60 weight percent. At this juncture, a small stainless steel bomb containing 71.9 grams of $BF_3$ and 15.9 grams of nitrogen gas (1450 p.s.i.g.) was attached to the feed inlet to the catalyst case. At intervals a small amount of $BF_3$–$N_2$ mixture was added to the feed. There was obtained a dramatic increase in conversion which was maintained throughout the period of $BF_3$ addition. Indeed, conversion which had fallen from about 89 weight percent to about 56 weight percent very sharply rose upon addition of the $BF_3$ within a matter of 3 to 4 volumes per volume of catalyst to approximately 94, and then thereafter averaged well above 80 percent conversion to Sulfole (a trademark for tert-dodecyl mercaptan as prepared from propylene tetramer).

Total crude product made during the $BF_3$ addition was 4500 ml. with 61 grams $BF_3$ added.

EXAMPLE II

Two other samples of Filtrol catalyst (Grades 25 and 62) were tried. The Grade 25 was screened to 10–20 mesh size. Results were quite similar to those shown in Example I. Conversion jumped from 63 percent to 85–90 weight percent and was maintained at this high level for the next 24 volumes over the catalyst.

In Examples I and II, in the catalyst bed as there used, some plugging was experienced and for this reason the runs were discontinued. However, the beneficial effect of the introduction of $BF_3$ according to the invention was clearly demonstrated.

EXAMPLE III

A further run was made using Houdry Type M–46, 6–48 mesh, silica-alumina catalyst (10% $Al_2O_3$; 90% $SiO_2$). Procedure and conditions were as in Examples I and II. The poisoning effect of the methanol was such that an original conversion of about 97 percent to Sulfole very sharply dropped within about 4–5 volumes to approximately 32 weight percent, but upon addition of $BF_3$ rose within a low of approximately 2–3 volumes to an average of approximately 80 volume percent. The run was continued until about 27 volumes had been passed through the catalyst; 21 volumes 3,700 ml. of effluent was made during the period of $BF_3$ addition. $BF_3$ plus nitrogen added was 0.046 lb. (21 grams) of which half was estimated to be $BF_3$. Thus, about 2500 grams of tert-dodecyl mercaptan product was made with consumption of only 11 grams of $BF_3$. After this run the catalyst bed was inspected. No sign of plugging or caking was found. This example in addition to showing elimination of whatever plugging problem occurred in the earlier examples also shows that not withstanding the considerable effect of methanol upon the silica-alumina catalyst, the $BF_3$ addition brought the conversion up to a very high level very quickly.

In view of the fact that no plugging occurs with the silica-alumina type catalyst, this catalyst is now believed to be suited to the best mode of operating the invention and is pointed out to be such to satisfy the patent law and practice requirements.

While the invention has been described in connection with a now preferred embodiment, it will be evident to one skilled in the art in possession of this disclosure, having studied the same, that an alcohol can be removed from a gas by contacting the same with boron trifluoride.

Alcohols which may be found in gases are those which are substantially vaporized or otherwise carried in the gas containing stream, such as, for example, methanol, ethanol, propanol and butanols.

Further, a person skilled in the art will appreciate that this invention can be applied to whatever gases or vapors may contain an alcohol. Upon formation of the $BF_3$-alcohol reaction product, this product can be treated to recover a pure alcohol therefrom and the boron fluoride thus released can be reused.

Reasonable variation and modification are possible in the scope of the foregoing disclosure of the invention, the essence of which is that there have been set forth a method for sequestering alcohol from a gas or vapor, e.g., methanol, in a hydrogen sulfide gas by contacting said gas with boron trifluoride, a method for enhancing production of mercaptan from a hydrogen sulfide gas containing an alcohol, e.g., methanol, employing a mercaptan synthesis catalyst which is poisoned by said alcohol by treating said gas in the system with boron trifluoride or as now preferred admixing boron trifluoride with said gas before it contacts the catalyst, substantially as described herein.

I claim:

1. A method for the production of a mercaptan from an olefin and a hydrogen sulfide gas containing a low boiling alcohol employing a solid mercaptan synthesis catalyst, the efficiency of which is substantially impaired by said alcohol, which comprises treating said hydrogen sulfide gas by contacting said gas with boron trifluoride to sequester the alcohol.

2. A method according to claim 1 wherein the low boiling alcohol is methanol.

3. A method according to claim 1 wherein the hydrogen sulfide is reacted with a compound according to the equation

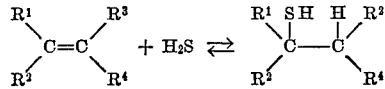

in which $R^1$, $R^2$, etc., represent the same or different alkyl, hydrogen or an aryl or radical, and in which SH is the sulfhydryl radical.

4. A method according to claim 1 wherein the boron trifluoride is added to the hydrogen sulfide gas prior to contacting said gas with said olefin.

5. A method according to claim 4 wherein said gas and said olefin are contacted with said solid mercaptan synthesis catalyst after the addition of the boron trifluoride.

6. A method according to claim 1 wherein the catalyst is an $Al_2O_3$ and $SiO_2$ containing catalyst.

7. A method according to claim 6 wherein the catalyst is an acid activated adsorption contact catalyst made from montmorillonite.

8. A method for the production of tert-dodecyl mercaptan using an alcohol contaminated hydrogen sulfide gas in the presence of a solid mercaptan synthesis catalyst which comprises passing propylene tetramer, feed gas and boron trifluoride in an amount effective to sequester a substantial proportion of the contaminating alcohol into contact with said catalyst under mercaptan synthesizing conditions of operation.

References Cited

UNITED STATES PATENTS

| | | | |
|---|---|---|---|
| 2,481,583 | 9/1949 | Fenn et al. | 260—609 |
| 2,498,872 | 2/1950 | Bell et al. | 260—609 |
| 2,610,981 | 9/1952 | Short | 260—609 |
| 3,005,030 | 10/1961 | Robinson | 260—609 |
| 3,006,966 | 10/1961 | Doumani | 260—609 |
| 3,032,592 | 5/1962 | Frantz and Glass | 260—609 |
| 3,035,097 | 5/1962 | Deger et al. | 260—609 |
| 3,051,758 | 8/1962 | Frantz and Warner | 260—609 |
| 3,053,902 | 9/1962 | Doumani | 260—609 |
| 3,083,231 | 3/1963 | Ray | 260—609 |

OTHER REFERENCES

Olah: "Friedel Crafts and Related Reactions" (1963), pp. 687–688.

CHARLES B. PARKER, Primary Examiner

D. R. PHILLIPS, Assistant Examiner

U.S. Cl. X.R.

260—643